United States Patent
Jonas et al.

(10) Patent No.: US 9,740,753 B2
(45) Date of Patent: Aug. 22, 2017

(54) USING SPHERES-OF-INFLUENCE TO CHARACTERIZE NETWORK RELATIONSHIPS

(75) Inventors: Jeffrey J. Jonas, Las Vegas, NV (US); Paul D. Hulseberg, Edmond, OK (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1417 days.

(21) Appl. No.: 12/338,650

(22) Filed: Dec. 18, 2008

(65) Prior Publication Data

US 2010/0161662 A1    Jun. 24, 2010

(51) Int. Cl.
| | | |
|---|---|---|
| G06Q 10/00 | (2012.01) | |
| G06F 17/30 | (2006.01) | |
| G06Q 10/10 | (2012.01) | |
| G06Q 30/02 | (2012.01) | |

(52) U.S. Cl.
CPC .. *G06F 17/30539* (2013.01); *G06F 17/30604* (2013.01); *G06Q 10/107* (2013.01); *G06Q 30/02* (2013.01)

(58) Field of Classification Search
USPC ...................................................... 705/1, 319
See application file for complete search history.

(56) References Cited

U.S. PATENT DOCUMENTS

| | | |
|---|---|---|
| 6,629,097 B1 | 9/2003 | Keith |
| 6,950,791 B1 | 9/2005 | Bray et al. |
| 2003/0023685 A1 | 1/2003 | Cousins et al. |
| 2004/0153352 A1 | 8/2004 | Berns et al. |
| 2005/0033665 A1 | 2/2005 | Kumhyr |
| 2005/0159970 A1 | 7/2005 | Buyukkoten et al. |
| 2005/0165715 A1* | 7/2005 | Farnham et al. ................. 707/1 |
| 2005/0177405 A1 | 8/2005 | Turner |
| 2005/0216300 A1 | 9/2005 | Appelman et al. |
| 2006/0195536 A1* | 8/2006 | Tsuboi et al. ................. 709/206 |
| 2006/0247940 A1 | 11/2006 | Zhu et al. |
| 2006/0290697 A1 | 12/2006 | Madden et al. |
| 2009/0177744 A1* | 7/2009 | Marlow et al. ............... 709/204 |

OTHER PUBLICATIONS

Mercier, A., et al. "Sphere of Influence Model in Information Retrieval," The 2005 IEEE International Conference on Fuzzy Systems, pp. 120-125.
Cheng, et al. "An Optimization Formulation for the Existence of Complete Spheres-of-Influence Graphs," Department of Mathematics and Statistics: Oakland University, Apr. 19, 2002, pp. 1-9.

* cited by examiner

*Primary Examiner* — Gabrielle McCormick
(74) *Attorney, Agent, or Firm* — Patterson + Sheridan, LLP

(57) ABSTRACT

Techniques are disclosed for using spheres-of-influence to characterize network relationships, where a graph depicts stronger relationships as being closer to an entity than more tenuous relationships. That is, while an entity may have many first-degree relationships, some relationships are closer than others. Thus, relationships where one entity may have a greater degree of influence over another are characterized as being closer to an entity in a graph. Similarly, a tenuous first-degree relationship may be characterized as being at a greater "depth" from the entity in the graph.

21 Claims, 7 Drawing Sheets

ENTITY RELATIONSHIPS PRIOR TO SEMANTIC RECONCILIATION

ENTITY RELATIONSHIPS AFTER SEMANTIC RECONCILIATION

USING SPHERES-OF-INFLUENCE TO CHARACTERIZE NETWORK RELATIONSHIPS

BACKGROUND OF THE INVENTION

Field of the Invention

Embodiments of the invention are generally directed to characterizing network relationships.

Description of the Related Art

A "social network" generally refers to a collection of personal or professional relationships between individuals. Social networks often have a critical role to play in managing organizations, enabling problem-solving, decision-making, collaboration, and information sharing, as well as facilitating trade and commerce. A social network graph provides a graph illustrating relationships between individuals. Social network graphs frequently represent individuals using nodes and links between nodes to indicate a relationship between any two individuals (or other organizational entity, e.g., a corporation).

Existing technologies for generating social network graphs typically rely on "degrees of separation" to build and display a social network. For example, users specify a number of degrees-of-relationship to view for a primary entity and then view related entities to the specified degree of depth. Often, relationships between entities (typically a person) are based on self-identification. That is, individuals specify who they know (or they are friends with). This allows a graph to be generated that presents not just friends (first-degree relationships), but friends-of-friends (second-degree relationships), and friends-of-friends-of-friends (third-degree relationships), etc. When users self-identify relationships in this manner they typically, even if only implicitly, specify first-degree relationships of some level of importance. That is, although an individual may have passing first-degree contacts with many people, only individuals with whom they have a relationship of some minimum strength or quality are self-identified as being part of their social network.

Another approach for generating a social network graph is to rely on records from one or more datasets. For example, a large number of email messages could be analyzed to create an entity for each unique "from" or "to" address and a link between two entities based on the same. Of course, relationships between individuals could be identified using a wide variety of data records. In this example, each relationship in a social network graph may be based on email messages addressed from one individual to another. However, if one person has multiple email addresses, then a social network graph generated in this manner may end up having multiple entities (nodes) representing the same individual. For example, a separate entity in a social network graph may be created to represent the same person's work email address and home email address. If additional datasets are used, this may result in additional entities in the social network graph that, ultimately, refer to a single individual.

SUMMARY OF THE INVENTION

One embodiment of the invention provides a computer-implemented method of characterizing a network of relationships between entities. The method may generally include evaluating a plurality of data records to identify groups of one or more data records, where each data record identifies at least an entity and each group of data records refers to a same entity. The method may also include evaluating the identified groups of one or more data records to identify one or more relationships between the respective entities represented by the respective groups of data records and determining a distance score for each of the one or more identified relationships. Each distance score provides a measure of relationship strength between two of the entities in a given identified relationship, based on the group of data records corresponding to the two entities. The method may also include generating a sphere-of-influence network of the respective entities represented by the respective groups of data records. The sphere-of-influence network characterizes the identified relationships between entities based on the determined distance scores.

Another embodiment of the invention includes a computer program product for characterizing a network of relationships between entities, the computer program product may generally comprise a computer usable medium having computer usable program code. The program code may be generally configured to evaluate a plurality of data records to identify groups of one or more data records, where each data record identifies at least an entity and each group of data records refers to a same entity. The program code may be further configured to evaluate the identified groups of one or more data records to identify one or more relationships between the respective entities represented by the respective groups of data records. The program code may be further configured to determine a distance score for each of the one or more identified relationships. Each distance score provides a measure of relationship strength between two of the entities in a given identified relationship, based on the group of data records corresponding to the two entities. The program may be further configured to generate a sphere-of-influence network of the respective entities represented by the respective groups of data records. The sphere-of-influence network characterizes the identified relationships between entities based on the determined distance scores.

Still another embodiment of the invention includes a system having a processor and a memory containing a program. The program, when executed by the processor, may generally configured to evaluate a plurality of data records to identify groups of one or more data records, where each data record identifies at least an entity and each group of data records refers to a same entity. The program may be further configured to evaluate the identified groups of one or more data records to identify one or more relationships between the respective entities represented by the respective groups of data records and determine a distance score for each of the one or more identified relationships. Each distance score provides a measure of relationship strength between two of the entities in a given identified relationship, based on the group of data records corresponding to the two entities. The program may be further configured to generate a sphere-of-influence network of the respective entities represented by the respective groups of data records, wherein the sphere-of-influence network characterizes the identified relationships between entities based on the determined distance scores.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
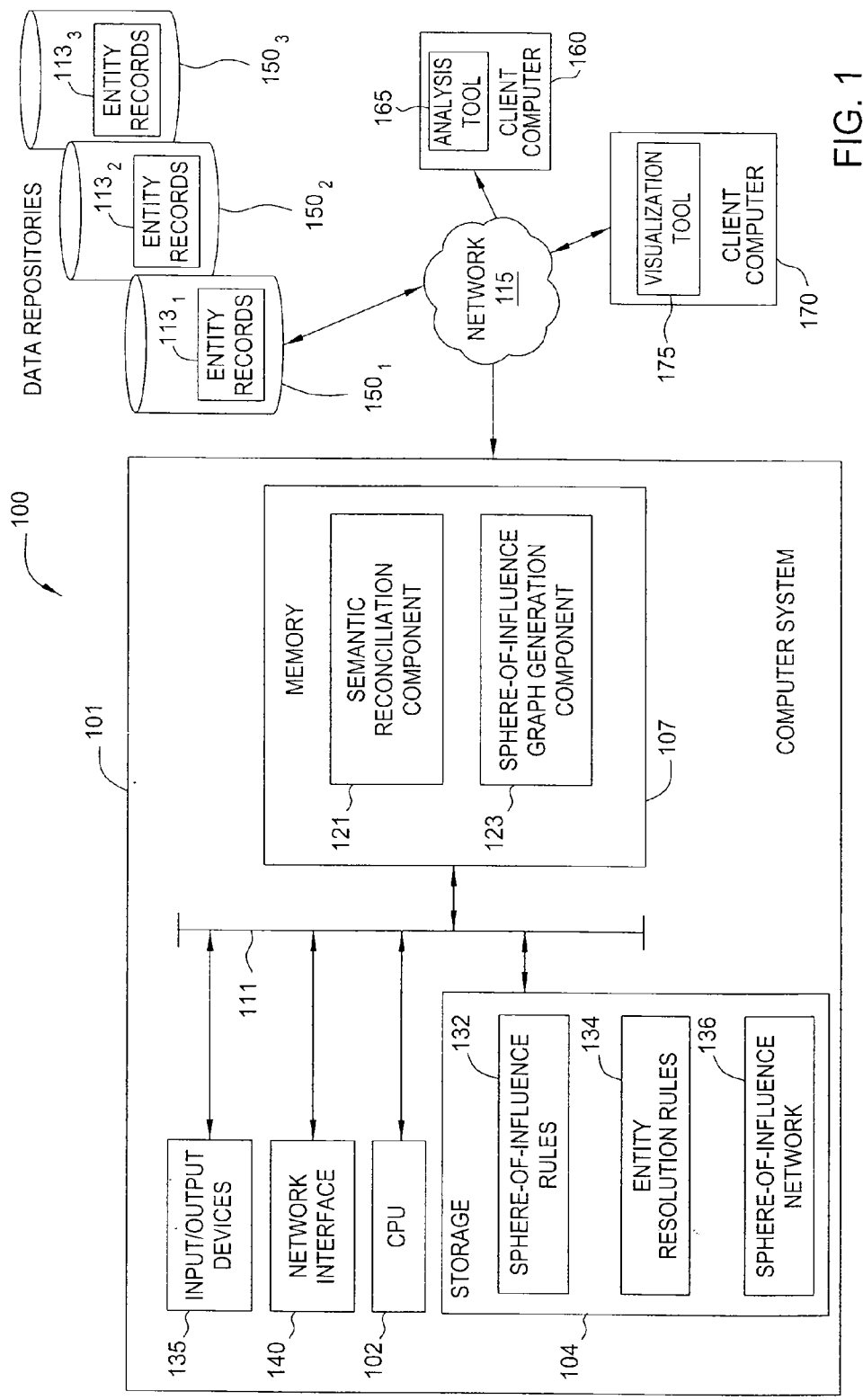
FIG. 1 is a block diagram illustrating a computing environment configured according to one embodiment of the invention.

Embodiments of the invention are generally directed to using spheres-of-influence to characterize network relationships. In one embodiment, a social network graph is developed and managed that depicts stronger relationships as being closer to a central individual than more tenuous relationships. That is, while an individual may have many first-degree relationships, only some of these relationships are likely to be important to the individual. Thus, relationships where one individual may have a greater degree of influence over another are characterized as being closer to the central individual in a social network graph. Similarly, a tenuous first-degree relationship may be characterized as being at a greater "depth" from the individual in the social network graph. In this way a second degree relationship can be closer in distance than some first degree relationships. In one embodiment, a sphere-of-influence graph may be constructed in anticipation of a user request. The user request may be submitted by a human user interested in visualizing the graph, but may also be another system requesting an ordered list of entities represented by the graph within a certain depth of a plurality of specified entities.

In one embodiment, the relationship strength between two individuals may be constructed by evaluating one or more data points indicating a relationship between individuals (e.g., an email message from one person to another or a record indicating two individuals share something in common such as a phone number or an address). That is, when data records indicate a "first-degree" relationship between two individuals, the data records are used to assign a relationship score. Further, the score may in some cases also carry an affinity—that is whether the relationship is evaluated to be positive (close in a favorable way e.g., current spouse) or negative (close in an unfavorable way e.g., an opposing party in a lawsuit). Further still, because different data records may refer to the same individual, data sets are semantically reconciled to reduce the occurrence of multiple entities being generated that, in fact, refer to the same individual. For example, multiple email addresses that refer to the same individual, or records that reference a person with a related name (e.g., "Jim Smith" and "James Smith") living at the same address with the same date of birth may be semantically reconciled so that a social network graph depicts these entities as being a single individual. In any case, relationships determined to be more significant or stronger than others, relatively speaking, are represented as being closer to one another in a sphere-of-influence graph. Thus, rather than enabling users to toggle through degrees of separation, users may toggle though spheres-of-influence to show relationships at a specified depth.

In one embodiment, strengths are determined between each semantically reconciled node in a network graph. As stated, the entities represented by nodes in the graph may represent individuals, but may represent any group of entities where the strength of inter-entity relationships may be characterized. These strengths, in conjunction with node depth are used to compute a sphere-of-influence value. The formula for determining relationship strength may provide a number of user-configurable parameters, e.g., how much to increase, decrease, or scale a relationship strength between two individuals based on the presence (or absence) of a given data record (e.g., email communications, phone calls, roommates, business partners, siblings, etc.). The sphere of influence graph may be requested by a user e.g., for visualization or by a system e.g., an automated request for a list of all entities within a certain depth from a selected entity. Should a user want to visualize a sphere-of-influence network graph related to a given entity, a graphical user interface may present the user with a dial or slideable graphical user interface construct used to specify a sphere-of-influence depth, and the graph then displaying connections between entities that are less than or equal to the selected sphere-of-influence depth.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a block diagram illustrating a computing environment 100 configured according to one embodiment of the invention. In this example, a server computer system 101 is included to be representative of existing computer systems, e.g., desktop computers, server computers, laptop computers, tablet computers, and the like. However, the computer system 101 illustrated in FIG. 1 is merely an example of a computing system. Embodiments of the present invention may be implemented using other computing systems, regardless of whether the computer systems are complex multi-user computing systems, such as a cluster of individual computers connected by a high-speed network, single-user workstations, or network appliances lacking non-volatile storage. Further, the software applications described herein may be implemented using computer software applications executing on existing computer systems. However, the software applications described herein are not limited to any currently existing computing environment or programming language, and may be adapted to take advantage of new computing systems as they become available. Additionally, the server computer system 101 includes input/output devices 135 such as a mouse, keyboard and monitor, as well as a network interface 140 used to connect computer system 101 to network 115.

As shown, the server computer system 101 includes a central processing unit (CPU) 102, which obtains instructions and data via a bus 111 from memory 107 and storage 104. CPU 102 represents one or more programmable logic devices that perform all the instruction, logic, and mathematical processing in a computer. For example, CPU 102 may represent a single CPU, multiple CPUs, a single CPU having multiple processing cores, and the like. Storage 104 stores application programs and data for use by computer system 101. Storage 104 may be hard-disk drives, flash memory devices, optical media and the like. The server computer system 101 may be connected to a data communications network 115 (e.g., a local area network, which itself may be connected to other networks such as the internet). As shown, storage 104 includes entity reconciliation rules 134, sphere-of-influence rules 132 and a sphere-of-influence network 136.

In one embodiment, the entity reconciliation rules 134 specify how different records may be semantically reconciled such that records referring to a single entity are conjoined together (e.g., email messages with different addresses used by the same individual or records that reference a person with a related name (e.g., "Jim Smith" and "James Smith") living at the same address). That is, entity reconciliation rules 134 specify how different records should be conjoined together when generating a sphere-of-influence network graph. The sphere-of-influence rules 132 specify how semantically reconciled entities ("resolved entities") should be evaluated for determining a relationship "depth" between them. The sphere-of-influence network 136 represents the results of applying the entity reconciliation rules 134 and the sphere-of-influence rules 132 to a particular collection of identity records.

Memory 107 can be one or a combination of memory devices, including random access memory, nonvolatile or backup memory, (e.g., programmable or flash memories, read-only memories, etc.). As shown, memory 107 includes a semantic reconciliation component 121 and a sphere-of-influence graph generation component 123. In one embodiment, the semantic reconciliation component 121 may provide a software application configured to evaluate records from multiple data sets using the entity reconciliation rules 134 to determine sets of records related to a single entity (e.g., an individual person). Similarly, the sphere-of-influence graph generation component 123 may provide a software application configured to identify relationships between entities (e.g., between individual persons) represented by data sets semantically reconciled using the entity resolution rules 134. As stated, the results may be stored in storage 104 in the sphere-of-influence network 136. Further, in one embodiment, the sphere-of-influence network 136 may be dynamic in that as new identity records are supplied (or as the sphere-of-influence rules 132 and entity resolution rules 134 are modified), the sphere-of-influence network 136 is updated accordingly.

Additionally, FIG. 1 shows a client computer 160 and a client computer 170 configured to communicate with server computer system 101 over the network 115. Of course, one of ordinary skill in the art will recognize that client computers 160 and 170 are illustrated in a greatly simplified form so as to highlight aspects of the present invention. As shown, the client computer 165 includes an analysis tool 160 and the client computer 170 includes a visualization tool 175. In one embodiment, the analysis tool 160 and the visualization tool 175 may each provide a software application configured to submit requests to the server computer system 101 (and the sphere-of-influence graph generation component 123) for selected portions of the sphere-of-influence network 136.

In one embodiment, the visualization tool 175 may provide a software application configured to generate a visualization of portions of the sphere-of-influence network 136. Such a visualization may depict relationship depths between entities (e.g., individuals) represented by the records of semantically reconciled datasets. For example, the visualization component 175 may be configured to present a visual display of a sphere-of-influence network 136 that is centered on a particular entity. Further, relationships between the particular entity and others may be limited to relationships at a depth specified by a user. The visualization tool 175 may also allow requestors (users, systems, etc.) to dynamically change a maximum (or minimum) depth at which relationships between the particular entity and others are returned (e.g., for user visualization, ordered lists for automated processes, etc.). Similarly, the analysis tool 165 may provide a software application configured to submit requests to the server computer system 101 (and the sphere-of-influence graph generation component 123) for an ordered list of entities in the sphere-of-influence network 136. Such a request may specify a primary entity and a depth at which related entities should be returned in response to the request. In one embodiment, the sphere-of-influence graph generation component 123 may respond to such a request with an ordered list of entitles, ordered according to their depth from the particular entity identified in the request.

Illustratively, computing environment 100 also includes a set of data repositories 150$_{1-3}$. Data repositories 150$_{1-3}$ each include a collection of entity records 113$_{1-3}$. In one embodiment, the entity records 113$_{1-3}$ are evaluated by the semantic reconciliation component 121 and the entity reconciliation rules 134 to determine semantically reconciled nodes. Distances between these resolved entities are then characterized by the sphere-of-influence graph. Examples of data repositories 150 include information from public sources (e.g., telephone directories and/or county assessor records, among others.) And also includes information from private sources, e.g., email messages, a list of employees and their roles within an organization, information provided by individuals directly such as forms filled out online or on paper, and records created concomitant with an individual engaging in some transaction (e.g., hotel check-in records or payment card use). Additionally, data repositories 150 may include information purchased from vendors selling data records as well as virtually any other form of data which may be used to resolve entities and determine relationships between disparate entities. Of course, the actual data repositories 150 used by the semantic reconciliation component 121 and the entity reconciliation rules 134 may be tailored to suit the needs of a particular case, and may include any combination of the above data sources listed above, as well as other data sources and further.

Figure 2:
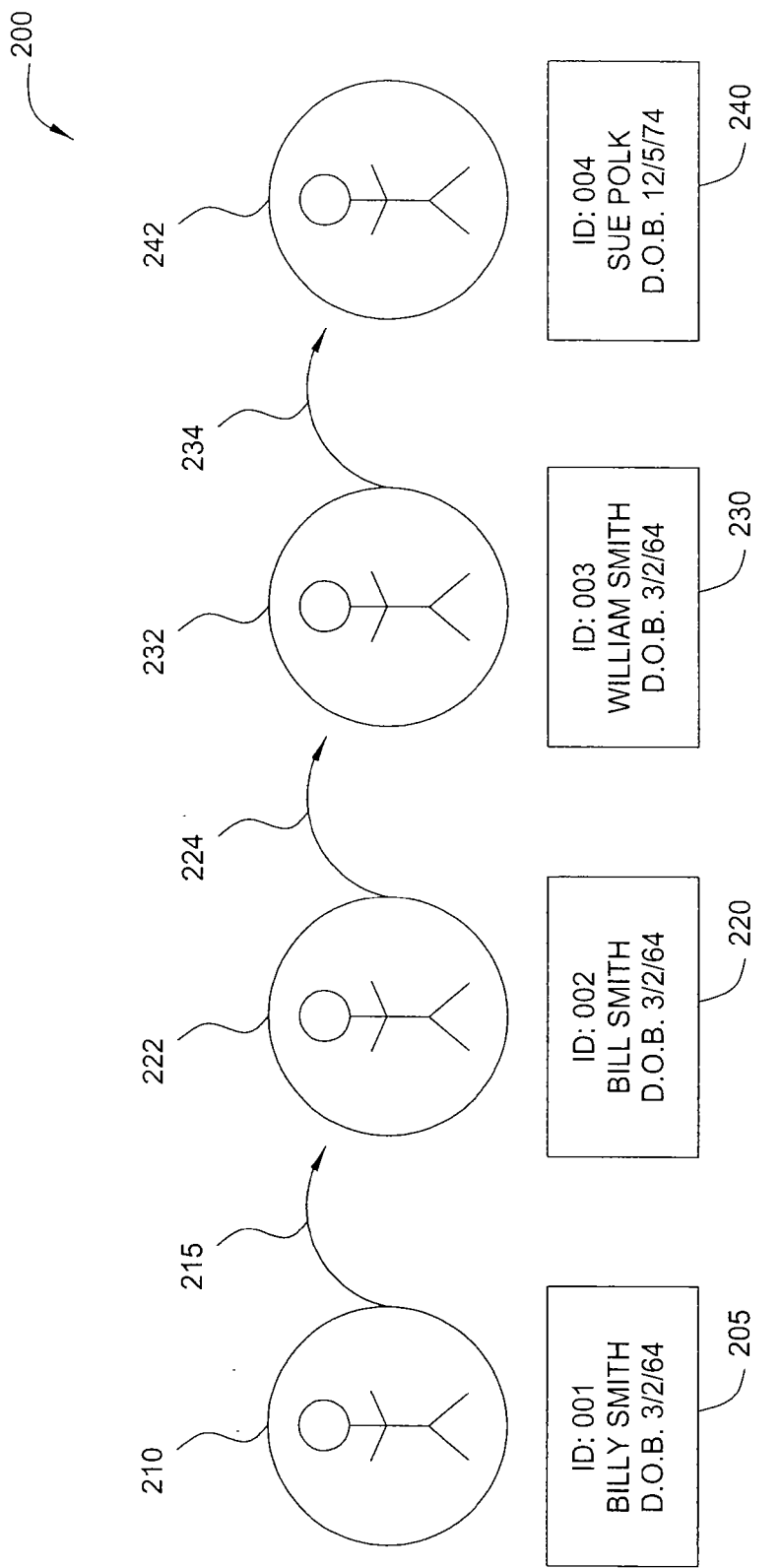
FIG. 2 is a block diagram illustrating a social network graph generated from multiple datasets, prior to semantic reconciliation, according to one embodiment of the invention.

FIG. 2 is a block diagram illustrating a network graph 200 generated from multiple datasets prior to semantic reconciliation, as is typical in prior art. Illustratively, the graph includes four nodes 210, 222, 232, and 242. Each node is generated based on a data record identifying an individual. Data record 205 identifies "Billy Smith," data record 220 identifies "Bill Smith," data record 232 identifies "William Smith," and data record 242 identifies "Sue Polk," and node 210 corresponds to data record 205, node 222 corresponds to data record 220, node 232 corresponds to data record 230, and node 242 corresponds to data record 240. Further, based on the data records, a set of relationships between nodes has been identified. In this case, the individual represented by node 210 is shown having a relationship with the individual represented by node 222 (represented by a link arrow 215). Similarly, node 222 has a relationship to node 232, which itself as a relationship to node 242 (represented by link arrows 224 and 234). Based on the relationships shown in the network graph 200, the individual represented by node 210 has a relationship with the individual represented by node 242 at three-degrees of separation. However, in this example data records 205, 220, and 230 refer to an entity named "Billy Smith," "Bill Smith," and "William Smith," respectively, each having a birth date Mar. 2, 1964. Assume that the data records 205, 220, and 230 (and thus the nodes 210, 222, and 232) each refer to the same individual. One embodiment of the invention determines these entities are the same, resolving these entities by conjoining them through the semantic reconciliation process.

Figure 3:
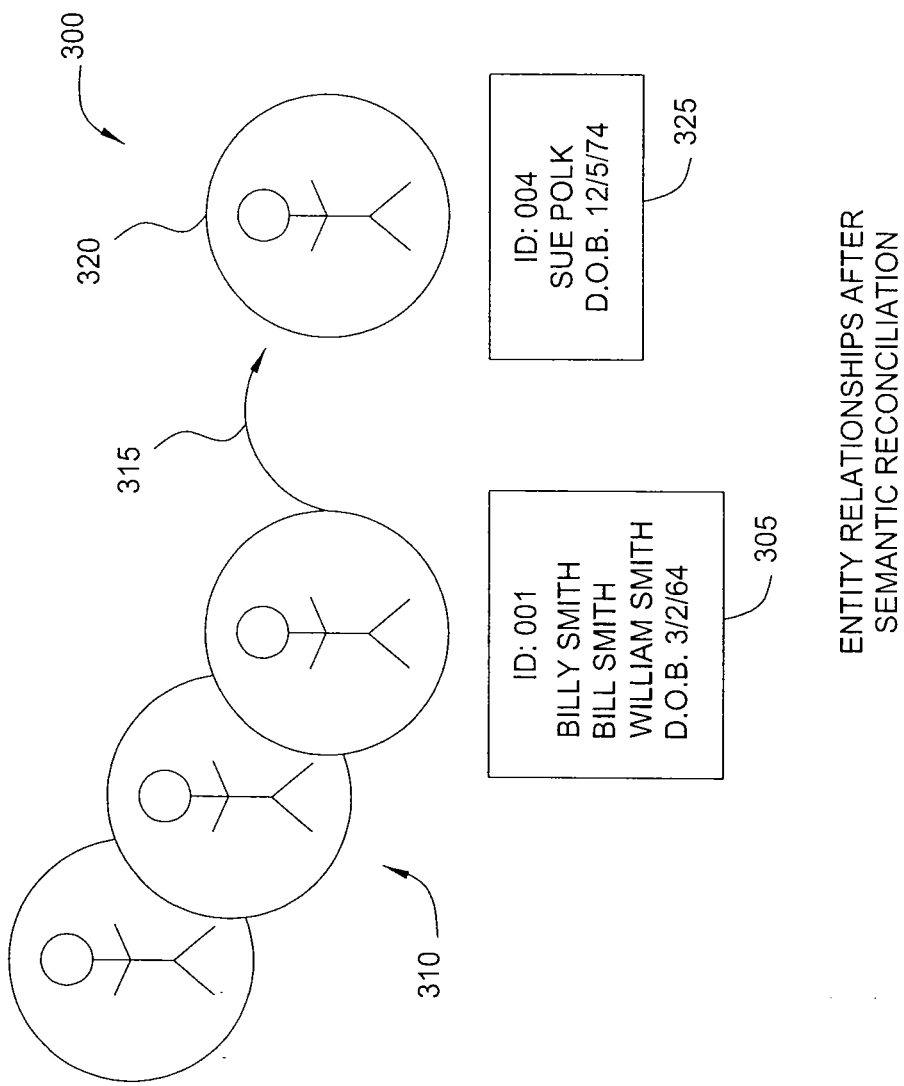
FIG. 3 is a block diagram illustrating a social network graph generated from multiple datasets, following semantic reconciliation, according to one embodiment of the invention.

FIG. 3 is a block diagram illustrating a network graph 300 generated from multiple datasets, following semantic reconciliation, according to one embodiment of the invention. As shown, the data record 305 has been semantically reconciled to reference a single individual, with three aliases "Billy Smith," "Bill Smith," and "William Smith." The data records 205, 220, and 230 from figure two may be semantically reconciled using the entity reconciliation rules 134. For example, one such rule could specify that when two records refer to an entity using the same last name, well-known variations of a first name, and share one other discriminating data point in common (e.g., a birth date), the three records should be reconciled to refer to a common entity. Thus, as shown, network graph 300 includes a node 310 referring to "Billy Smith," "Bill Smith," and "William Smith." Additionally, the network graph 300 includes a relationship between "Billy Smith" and a node 320 for "Sue Polk" (as represented by an arrow 315). Thus, the network graph 300 shows how records from multiple data repositories 150 may be semantically reconciled, resulting in a network graph that is more representative of the individuals, and relationships between individuals.

Figure 4:
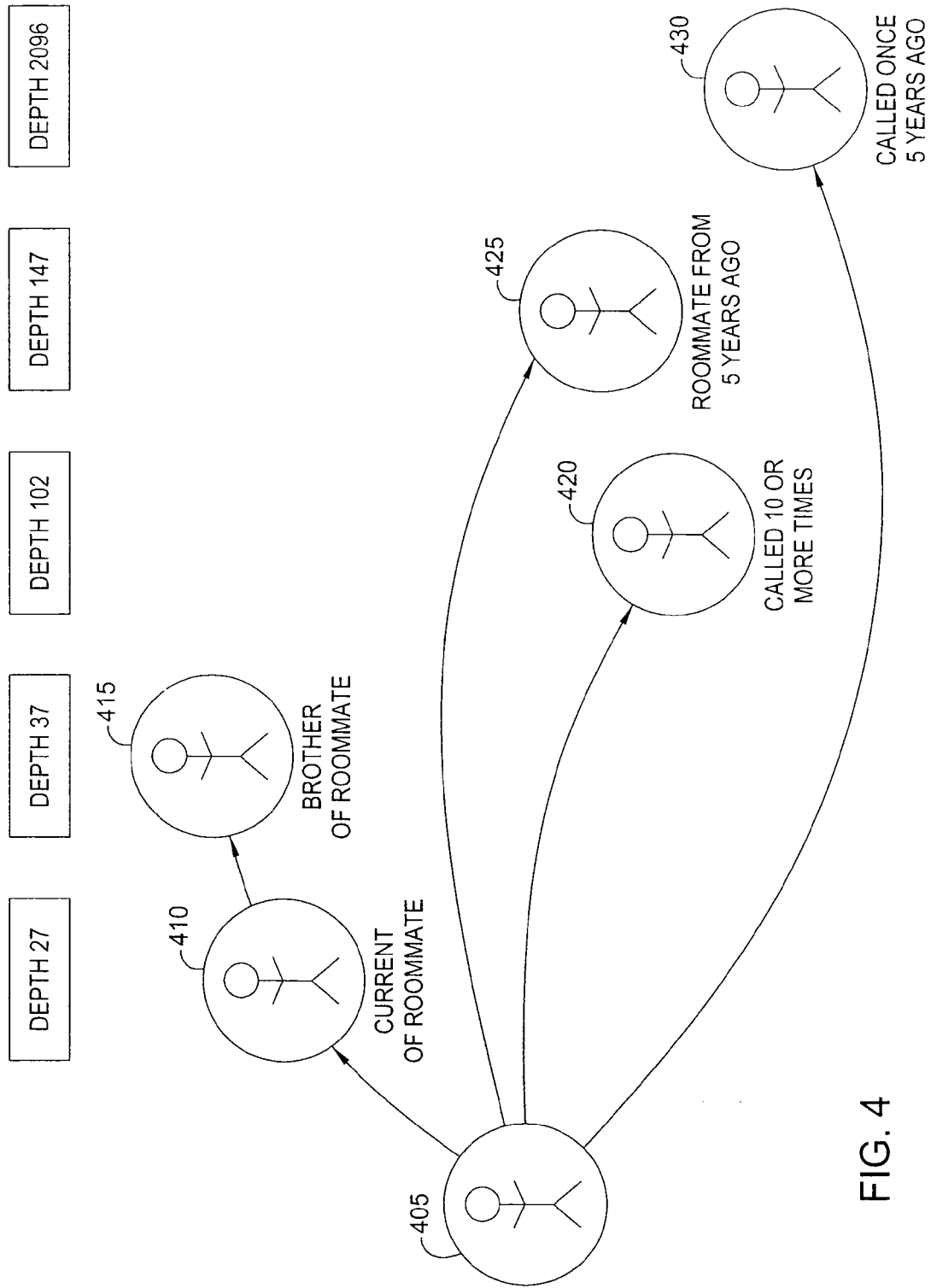
FIG. 4 is a block diagram using a sphere-of-influence to characterize network relationships, according to one embodiment of the invention.

FIG. 4 is a block diagram using sphere-of-influence graph 400 to characterize network relationships, according to one embodiment of the invention. Unlike the network graph 200 in FIG. 2, semantically reconciled data 300 is depicted in FIG. 3. Using semantically reconciled entities, sphere-of-influence graph 400 represents relationships between resolved entities using distance to indicate how "strong" the entity relationship based on the underlying records that indicate the existence of a relationship. Thus, rather than simply, treat all data as discrete entities with a traditional degree-of-separation representation, embodiments of the invention characterizes relationships in a sphere-of-influence graph 400. For example, sphere-of-influence graph 400 illustrates relationships for an individual at a node 405, and shows relationships to this individual to a maximum depth of 2096.

As shown, a current roommate (at node 410) is shown at a relatively short depth of 27. Further, a relationship from the current roommate to the brother of the roommate (at node 415) is shown at a depth of 37. This may be interpreted that the individual at node 405 is presumed to have a strong influence on the individual at node 410, i.e., with their roommate (and vice versa), and further, that the individual at node 405 is presumed to have a strong, but indirect, relationship to the individual at node 415, i.e., with their roommates' brother. In this example, the depth from the central individual at node 405 is 27 to the node 410, and a depth of 10 from that individual to node 415, resulting in the individual at node 415 being at a total depth of 37 from the central node 405. More distant relationships (i.e., relationships at a greater depth) include a prior roommate from five years ago (at node 425), an individual whom the central individual called 10 or more times in the last six months (at node 420), and an individual whom the central individual last called five years ago. As can be seen from the sphere-of-influence graph 400, the individuals at nodes 410, 420, 425, and 430 all have a first-degree relationship with the individual at node 405. However, rather than treat each of these relationships equally, the sphere-of-influence graph 400 characterizes these relationships at different depths, dropping off rapidly from individuals with a strong relationship to much more tenuous relationships. In one embodiment, a user may limit how "deep" the sphere-of-influence graph 400 shows relationships at all. For example, if the user specified a depth cutoff of "100" the individuals at nodes 420, 425, and 430 would be cut from the sphere-of-influence graph 400.

As shown, sphere-of-influence graph 400 shows the relationships with the individual at node 405 to the right of node 405. Assume for this example, that each of the relationships are presumed to have a "positive" affinity. Of course, relationships with a presumed "negative" affinity could also be displayed. For example, assume that the individual at node 405 was recently fired from a job (as determined from data records 113). In such a case, an entity could be characterized as indicating a presumed, strong negative affinity between the individual at node 405 (e.g., where one node represents an individual identified as a former spouse currently engaged in litigation). Depicting negative affinities can be handled in any number of ways (e.g., to the left, and close, to node 405 or to the right and color coded (red) or tagged appropriately).

Figure 5A:
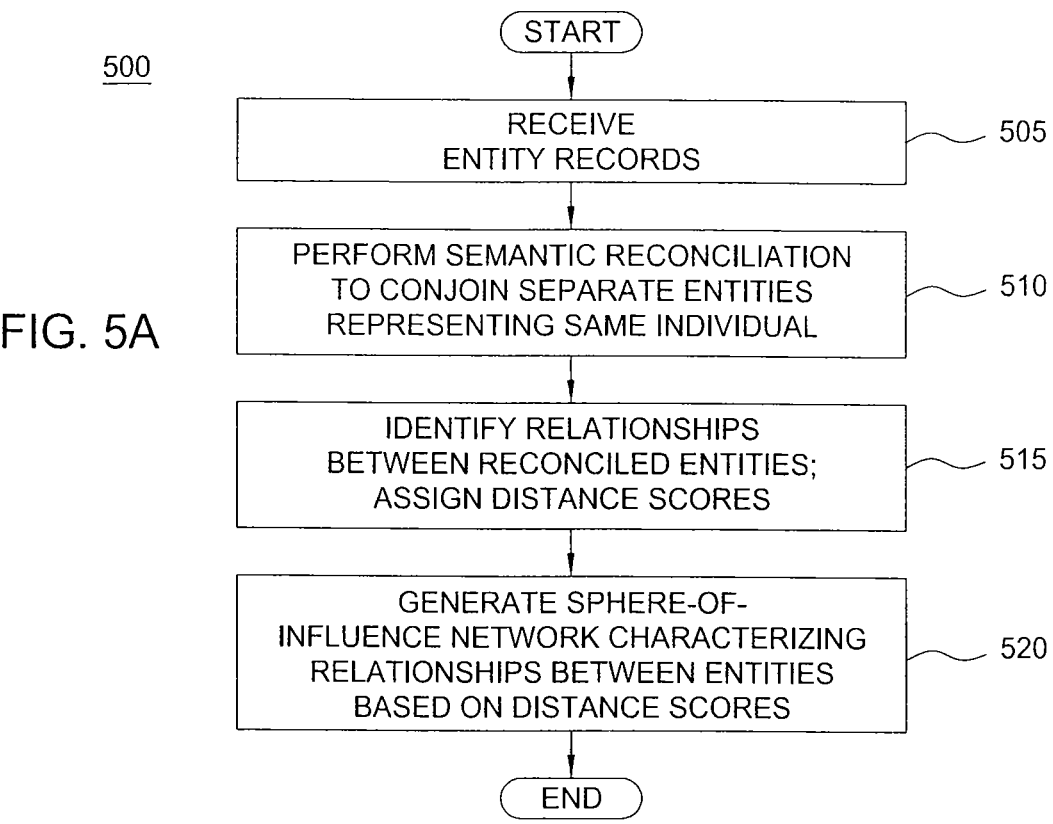
FIG. 5A is a flow diagram illustrating a method for generating a sphere-of-influence network using semantically reconciled datasets, according to one embodiment of the invention.

FIG. 5A is a flow diagram illustrating a method for generating a sphere-of-influence network using semantically reconciled datasets, according to one embodiment of the invention. As shown, the method 500 begins at step 505 where a collection of entity records are received. For example, as discussed above, records may be obtained from a variety of sources, both public and private. However, rather than simply identify any relationship, no matter how tenuous, embodiments of the invention evaluate data records indicating a relationship between individuals to predict how strong a relationships is between the two individuals, as well as, in some cases, determine whether the relationships should be characterized, and if so as a positive or negative relationship (or in some unusual cases both (e.g., a love/hate) affinity.

Further, as data records from multiple data sources may identify the same individual differently, the data records identified at step 505 are semantically reconciled at step 510. That is, at step 510, a semantic reconciliation process is performed to conjoin separate entity records believed to represent the same entity. For example, as described above, a semantic reconciliation component 121 may evaluate data records against a collection of entity reconciliation rules 134 to identify when records should be conjoined to form a set of semantically reconciled entities. Thus, for example, a group of records each referring to the same individual, but using different aliases (e.g., "Billy Smith," "Bill Smith," and "William Smith") are reconciled to a single entity. At step 515, relationships between reconciled entities are identified based on the collection of entity records (e.g., an email message from "William Smith" to "Sue Polk", etc.). Additionally, each identified relationship may be assigned a distance score. As described, the distance score may be used to provide a measure of relationship strength between two entities, based on the group of data records corresponding to the two entities. The distance score between any two individuals may be determined using a variety of configurable factors, including, e.g., a familial relationship, a temporal proximity, a spatial proximity, communications between individual persons, co-operative transactions performed by two individual persons, etc., as determined from data records indicating a relationship between two individuals. At step 520, a sphere-of-influence network 520 may be generated that characterizes relationships between entities based on the distance scores. Once generated, the sphere-of-influence network may be stored and requests for portions of the network may be received from users, processes, etc.

Figure 5B:
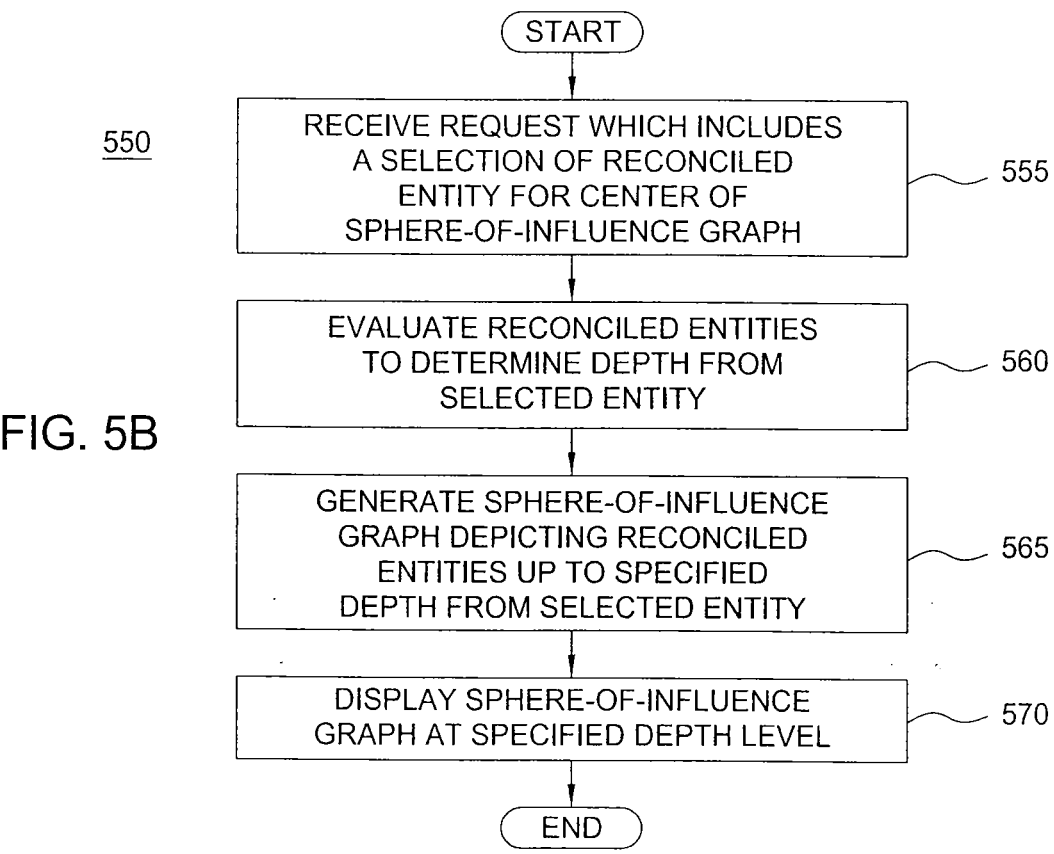
FIG. 5B is a flow diagram illustrating a method for accessing a sphere-of-influence network using semantically reconciled datasets, according to one embodiment of the invention.

For example, FIG. 5B is a flow diagram illustrating a method 550 for accessing a sphere-of-influence network using semantically reconciled datasets, according to one embodiment of the invention. As shown, at step 555, a user may specify a selection of a reconciled entity for the center of a visualization of a portion of the sphere-of-influence network. At step 560, the reconciled entities may be evaluated to identify identities that have a relationship to the selected entity (and relationships to those entities, and so on). Further the strength of relationships between entities (as represented by the distance scores) may be used to determine whether to include a given entity in a response to the request received at step 555. Once both the relationships between entities and the strength of such relationships are evaluated, at step 565, a sphere-of-influence graph may be generated that characterizes the depth of the reconciled entities from the entity selected at step 555. For example, a visualization may be generated which depicts relationships between entities having a greater measure of relationship strength more proximate to one another than relationships between entities having a lower measure of relationship strength, as determined using the distance scores. At step 570, the sphere-of-influence graph may be displayed, showing entities within a given depth of the central entity specified at step 555.

Figure 6:
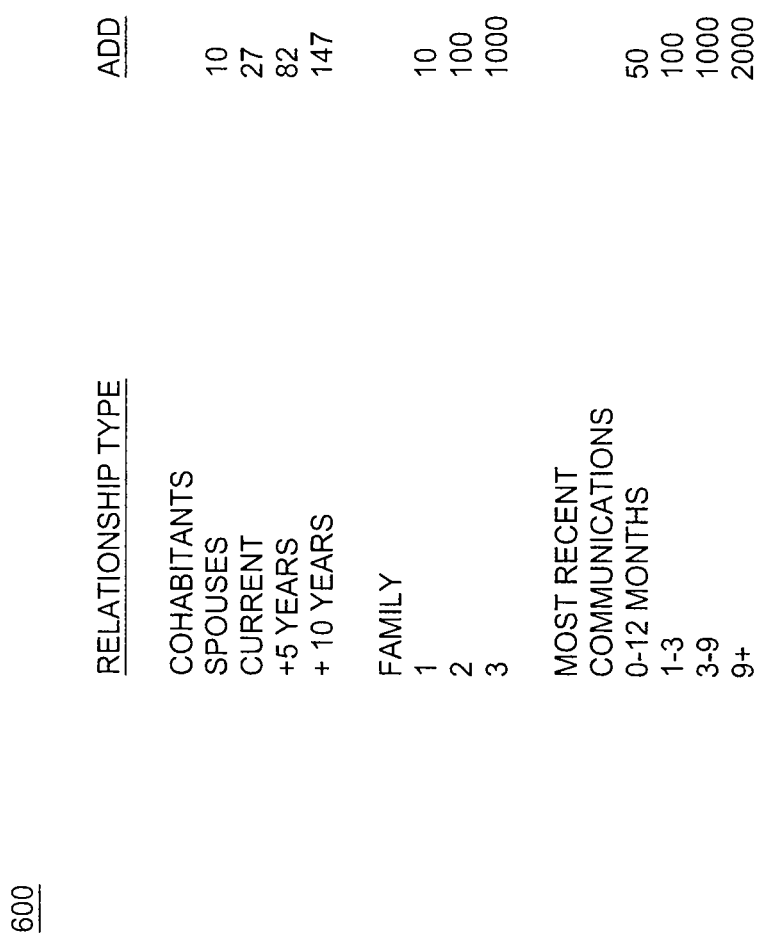
FIG. 6 is a block diagram illustrating an example scheme for determining a relationship distance between two entities in a semantically reconciled data set, according to one embodiment of the invention.

FIG. 6 is a block diagram illustrating an example scheme for determining a relationship distance between two entities in a semantically reconciled data set, according to one embodiment of the invention. In this relatively simple scheme, relationship depth is determined based on records indicating that two people cohabitate, have a familial relationship, and the time from a most recent communication between the two individuals (e.g., the most recent email message). Illustratively, records which indicate that one person is married to another results in a sphere-of-influence depth of 10 between two individuals, where records indicating that two people are currently roommates result in a sphere-of-influence depth of 27. Similarly, records indicating that two entities have a familial relationship add a score of 10, 100, or 1000, for first-degree, second-degree and third-degree consanguinity, respectively. Also, records indicating that two individuals have communicated with one another (e.g., by identifying to and from values in email messages) in the last 12 months, 1-3 years, 3-9, years, and 9+ years add the amounts to relationships depths as shown. Note, in this example, different records result in adding to a relationships depth score. Of course, in more sophisticated scenarios, different values could add, subtract, or scale a relationship depth score. Further, different scenarios could be used to determine both relationship depth and relationships affinity (e.g., positive or negative).

Figure 7:
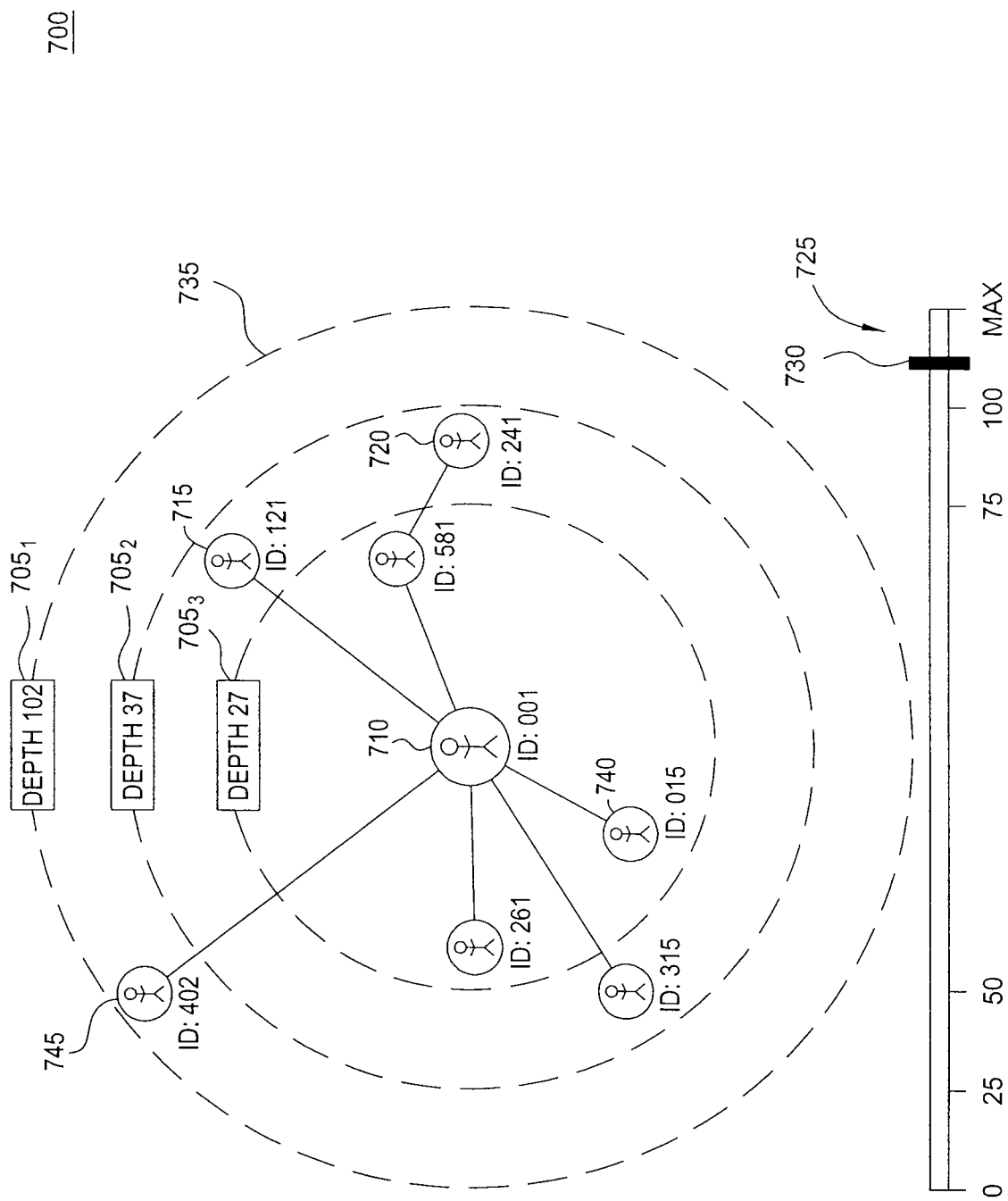
FIG. 7 is an example graphical user interface presenting a semantically reconciled social network graph using spheres-of-influence, according to one embodiment of the invention.

FIG. 7 is an example graphical user interface 700 presenting a sphere-of-influence network graph 735 using semantic reconciliation and spheres-of-influence, according to one embodiment of the invention. As shown, interface 700 includes a control bar 725 used to specify a maximum relationship depth to show, set using slider control 730. In this example, the sphere-of-influence network graph 735 is centered on an individual at node 710, and includes links to other individuals up do a depth just over 100. Additionally, markers 705$_{1-3}$ provide an individual of how deep different individuals. In this example, individuals at a greater depth are presented to have less influence (intimacy, familiarity, agreement, control, etc.) with the individual at node 710 than individual at a lesser depth. Thus, the individual at node 740 is presumed to have a greater degree of influence than the individual at node 715, even though both relationships are first-degree. Similarly, the individual at node 720 is presumed to have a greater degree of influence over the individual at node 710 than the individual at node 745, even though the individual at node 745 is a first-degree relationship and the individual at node 720 is a second-degree relationship.

Advantageously, as described above, embodiments of the invention use spheres-of-influence to characterize network relationships, where a social network graph may be generated that depicts stronger relationships as being closer to a central individual as compared to more tenuous relationships which are depicted as being relatively farther away from the central individual. That is, while an individual may have many first-degree relationships, only some of these relationships are likely to be important to the individual. Thus, relationships where one individual may have a greater degree of influence over another are characterized as being relatively closer to the central individual in a sphere-of-influence network graph. Similarly, a tenuous first-degree relationship may be characterized as being at a relatively greater "depth" from the individual in the sphere-of-influence network graph.

While the foregoing is directed to embodiments of the present invention, other and further embodiments of the invention may be devised without departing from the basic scope thereof, and the scope thereof is determined by the claims that follow.

What is claimed is:

1. A computer-implemented method of characterizing a network of relationships between entities, the computer-implemented method comprising:
    evaluating a plurality of data records to identify: (i) groups of one or more data records, wherein each data record identifies at least an entity, wherein each group of data records refers to a same entity; and (ii) one or more relationships between the respective entities represented by each of the groups of data records;
    determining, for each of the one or more relationships, a direct relationship strength between two of the entities in the respective relationship, based on the group of data records corresponding to the two entities;
    determining, for a first one of the entities and each of one or more second entities, an indirect relationship strength between the first entity and the respective second entity, wherein the first entity and the respective second entity have an identified relationship to a respective, intervening entity;
    generating, by operation of one or more computer processors, a sphere-of-influence network of the respective entities represented by the respective groups of data records, wherein the sphere-of-influence network characterizes the one or more relationships based on the direct and indirect relationship strengths;
    determining, based on the sphere-of-influence network, a set of result entities having at least a threshold relationship strength with the first entity, wherein the threshold relationship strength is set based on user input received via a slider control of a control bar of a graphical user interface; and
    generating a visualization depicting direct and indirect relationships, including direct and indirect relationship strengths, between the first entity and the set of result entities, the visualization depicting at least one relationship having a greater direct or indirect relationship strength more proximate to the first entity than at least one relationship having a lesser direct or indirect relationship strength, wherein the visualization is output.

2. The computer-implemented method of claim 1, further comprising:
    returning an ordered list of entities selected from the of the sphere-of-influence network, wherein each selected entity has an identified relationship with the specified entity having a relationship strength satisfying the threshold relationship strength.

3. The computer-implemented method of claim 1, wherein each group of data records referring to the same entity represents an individual person.

4. The computer-implemented method of claim 3, wherein the direct and indirect relationship strengths are each assigned one of a positive affinity and a negative affinity for the identified relationship between two individual persons associated with a given one of the direct and indirect relationship strengths.

5. The computer-implemented method of claim 3, wherein the relationship strength for each of the one or more identified relationships is determined based on a plurality of configurable factors, including at least one of a familial relationship, a temporal proximity, a spatial proximity, communications between individual persons, and a co-operative transaction performed by two individual persons associated with one of the identified relationships.

6. The computer-implemented method of claim 1, wherein the visualization comprises an initial visualization, wherein the threshold relationship strength is initially a first strength value but is subsequently set to a second strength value greater than the first strength value, wherein the computer-implemented method further comprises:
   subsequent to outputting the initial visualization for display, and responsive receiving a second user input via the slider control, setting the threshold relationship strength to a third strength value less than the first strength value; and
   responsive to setting the threshold relationship strength to the third strength value, generating an updated visualization depicting only those of the one or more direct and indirect relationships, including the direct and indirect relationship strengths, for the first entity and other entities of the sphere-of-influence network, that satisfy the third strength value, wherein at least one entity not in the initial visualization is displayed in the updated visualization.

7. The computer-implemented method of claim 6, wherein the visualization depicts a plurality of first-degree entities related to the first entity at distinct relationship distances from the first entity despite the plurality of first-degree entities being related to the first entity by a first degree;
   wherein the visualization depicts at least one second-degree entity of the first entity at a closer relationship distance from the first entity than at least one first-degree entity of the first entity;
   wherein the plurality of data records are evaluated to identify groups of one or more data records in order to perform semantic reconciliation to join separate entities representing the same individual;
   wherein the visualization represents the direct and indirect relationships between entities by depicting relationships between the first entity and other entities having greater direct and indirect relationship strengths more proximate to the first entity than relationships between entities having lesser direct or indirect relationship strengths.

8. The computer-implemented method of claim 7, wherein each group of data records referring to the same entity represents an individual person, wherein the computer-implemented method further comprises:
   receiving a request for an ordered list of entities represented by the sphere-of-influence network, wherein the request specifies one of the entities represented by one of the groups of data records and a fourth strength value; and
   returning an ordered list of entities selected from the of the sphere-of-influence network, wherein each selected entity has an identified relationship with the specified entity having a relationship strength satisfying the fourth strength value specified by the request.

9. The computer-implemented method of claim 8, wherein the direct and indirect relationship strengths are each assigned one of a positive affinity and a negative affinity for the identified relationship between two individual persons associated with a given one of the direct and indirect relationship strengths;
   wherein the relationship strength for each of the one or more identified relationships is determined based on a familial relationship, a temporal proximity, a spatial proximity, communications between individual persons, and a co-operative transaction performed by two individual persons associated with one of the identified relationships;
   wherein the visualization is output by an application having the graphical user interface, wherein the application includes a plurality of components including a semantic reconciliation component, a sphere-of-influence graph generation component, an analysis tool component, and a visualization tool component.

10. The computer-implemented method of claim 9, wherein the semantic reconciliation component is configured to evaluate the plurality of data records to identify groups of one or more data records to join separate entities representing the same individual;
    wherein the sphere-of-influence graph generation component is configured to, subsequent to the separate entities representing the same individual being joined, evaluate the identified groups of one or more data records to identify one or more relationships between the respective entities represented by the respective groups of data records.

11. The computer-implemented method of claim 10, wherein the analysis tool component is configured to submit requests to visualize one or more portions of the sphere-of-influence network, wherein the visualization tool component is configured to generate the visualization.

12. A computer program product for characterizing a network of relationships between entities, the computer program product comprising:
    a non-transitory computer-usable medium having computer usable program code embodied therewith, the computer usable program code configured to:
       evaluate a plurality of data records to identify: (i) groups of one or more data records, wherein each data record identifies at least an entity, wherein each group of data records refers to a same entity; and (ii) one or more relationships between the respective entities represented by each of the groups of data records;
       determine, for each of the one or more relationships, a direct relationship strength between two of the entities in the respective relationship, based on the group of data records corresponding to the two entities;
       determine, for a first one of the entities and each of one or more second entities, an indirect relationship strength between the first entity and the respective second entity, wherein the first entity and the respective second entity have an identified relationship to a respective, intervening entity;

generate a sphere-of-influence network of the respective entities represented by the respective groups of data records, wherein the sphere-of-influence network characterizes the one or more relationships based on the direct and indirect relationship strengths;

determine, based on the sphere-of-influence network, a set of result entities having at least a threshold relationship strength with the first entity, wherein the threshold relationship strength is set based on user input received via a slider control of a control bar of a graphical user interface; and generate a visualization depicting direct and indirect relationships, including direct and indirect relationship strengths, between the first entity and the set of result entities, the visualization depicting at least one relationship having a greater direct or indirect relationship strength more proximate to the first entity than at least one relationship having a lesser direct or indirect relationship strength, wherein the initial visualization is output.

13. The computer program product of claim 12, wherein the computer useable program code is further configured to:
return an ordered list of entities selected from the of the sphere-of-influence network, wherein each selected entity has an identified relationship with the specified entity having a relationship strength satisfying the threshold relationship strength.

14. The computer program product of claim 12, wherein each group of data records referring to the same entity represents an individual person.

15. The computer program product of claim 14, wherein the direct and indirect relationship strengths are each assigned one of a positive affinity and a negative affinity for the direct or indirect relationship between two individual persons associated with a given one of the direct and indirect relationship strengths.

16. The computer program product of claim 14, wherein the relationship strength for each of the one or more identified relationships is determined based on a plurality of configurable factors, including at least one of a familial relationship, a temporal proximity, a spatial proximity, communications between individual persons, and a co-operative transaction performed by two individual persons associated with one of the identified relationships.

17. A system, comprising:
a processor; and
a memory containing a program, which, when executed by the processor is configured to perform the steps of:
evaluating a plurality of data records to identify: (i) groups of one or more data records, wherein each data record identifies at least an entity, wherein each group of data records refers to a same entity; and (ii) one or more relationships between the respective entities represented by each of the groups of data records;

determining, for each of the one or more relationships, a direct relationship strength between two of the entities in the respective relationship, based on the group of data records corresponding to the two entities;

determining, for a first one of the entities and each of one or more second entities, an indirect relationship strength between the first entity and the respective second entity, wherein the first entity and the respective second entity have an identified relationship to a respective, intervening entity;

generating a sphere-of-influence network of the respective entities represented by the respective groups of data records, wherein the sphere-of-influence network characterizes the one or more relationships based on the direct and indirect relationship strengths;

determining, based on the sphere-of-influence network, a set of result entities having at least a threshold relationship strength with the first entity, wherein the threshold relationship strength is set based on user input received via a slider control of a control bar of a graphical user interface; and generating an initial visualization depicting direct and indirect relationships, including the direct and indirect relationship strengths, between the first entity and the set of result entities, the visualization depicting at least one relationship having a greater direct or indirect relationship strength more proximate to the first entity than at least one relationship having a lesser direct or indirect relationship strength, wherein the initial visualization is output.

18. The system of claim 17, wherein the steps further comprise:
returning an ordered list of entities selected from the of the sphere-of-influence network, wherein each selected entity has an identified relationship with the specified entity having a relationship strength satisfying the threshold relationship strength.

19. The system of claim 17, wherein each group of data records referring to the same entity represents an individual person.

20. The system of claim 19, wherein the direct and indirect relationship strengths are each assigned one of a positive affinity and a negative affinity for the direct or indirect relationship between two individual persons associated with a given one of the direct and indirect relationship strengths.

21. The system of claim 19, wherein the relationship strength for each of the one or more identified relationships is determined based on a plurality of configurable factors, including at least one of a familial relationship, a temporal proximity, a spatial proximity, communications between individual persons, and a co-operative transaction performed by two individual persons associated with one of the identified relationships.

* * * * *